Dec. 5, 1967   R. A. FRIEND   3,356,323
TIRE BEADS AND METHODS OF MAKING SAME
Filed Nov. 24, 1965
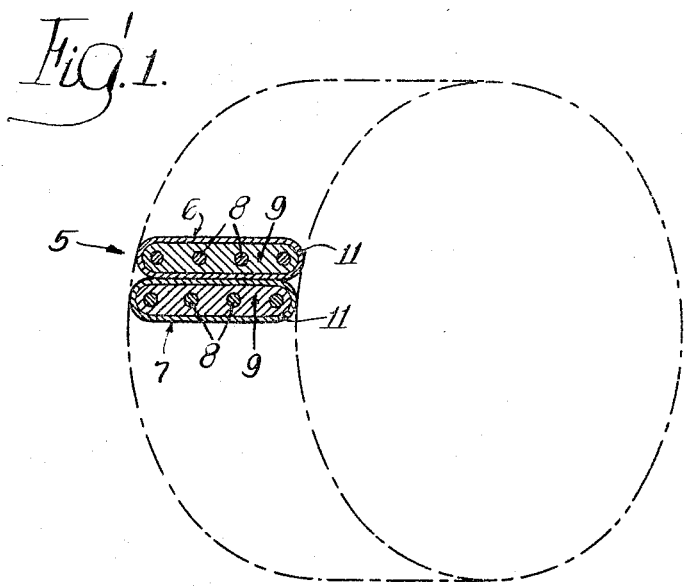
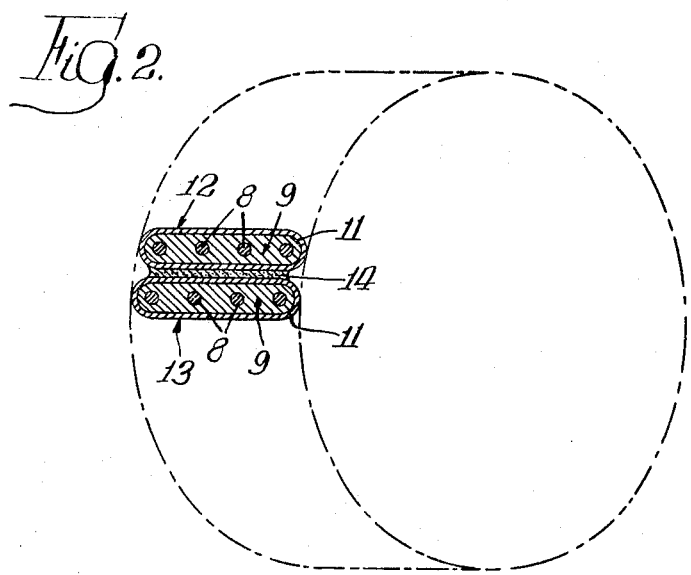
Inventor:-
Raymond A. Friend,
By Oxman, Jackson Boettle & Dunner
Attys.

United States Patent Office 3,356,323
Patented Dec. 5, 1967

3,356,323
TIRE BEADS AND METHODS OF MAKING SAME
Raymond A. Friend, Niles, Mich., assignor to National-Standard Company, Niles, Mich., a corporation of Delaware
Filed Nov. 24, 1965, Ser. No. 509,483
4 Claims. (Cl. 245—1.5)

The present invention relates to tire beads for pneumatic tires and methods of making tire beads.

Tire beads today are conventionally made by insulating a plurality of wires in side-by-side relation to form continuous strip material and then wind such strip material in a plurality of successive superposed layers. The insulating material is usually composed of uncured rubber and provides for retaining the wires in position in the wound bead. The tire beads are assembled with a tire carcass and other components of a tire, and the assembly then formed and cured to the desired tire configuration so that the bead rings become embedded in the completed tire.

In certain of the aforementioned tire beads of the prior art, the convolutions of wire are held together by the insulating material which is of nominal mechanical strength and much less than that of the material of the wire. The insulating material comprises a portion of the total cross sectional area of the completed bead so that the insulating material affords little or no mechanical strength for the bead. One approach of the art to avoid the aforementioned disadvantage is to employ flat strip material wound in superposed layers but such approach is unsatisfactory in that strip material cannot by known heat treatment or processing methods be provided with a tensile strength comparable to round wire so that for a given bead of desired tensile strength formed of strip material it must be of a cross-sectional area of an amount rendering the bead prohibitive or unsatisfactory for use in a pneumatic tire.

In view of the foregoing it has been proposed to provide a tire bead composed of a plurality of superposed layers of wire each comprising a plurality of successive convolutions of round wire in side-by-side relation with the several wires at least at their touching portions being joined to form a homogeneous bead to thus provide a bead of good mechanical strength for a given cross-sectional area.

The present invention is an improvement of the tire bead last noted and comprehends a construction composed of a plurality of circumferentially successive superposed layers in which each layer comprises a plurality of round wires disposed in side-by-side convolutions embedded in a mass of rigid material such as zinc or tin or other suitable metals, alloys or other materials for holding the convolutions of wires in each of the layers in predetermined fixed positions with respect to each other. If desired, the several layers may be affixed to each other at their adjoining portions by solder or other suitable adhesive to retain the several layers in fixed circumferential relation with respect to each other. Additionally the several layers or the whole assembly may be provided with an adhesive such as brass to provide for good rubber adhesion.

Preferred embodiments of the invention will be described in connection with the accompanying drawings in which:

FIGURE 1 is a perspective view of a portion of one form of bead constructed in accordance with the present invention; and FIGURE 2 is a perspective view of a portion of another form of bead according to the present invention.

Referring now to FIGURE 1 there is shown a tire bead 5 comprising a pair of circumferentially successive superposed layers 6 and 7 in which each layer comprises a plurality of wires 8 layed in successive convolutions in side-by-side relation.

In forming the layers 6 and 7 four strands, for example, of round wire suitable for a tire bead are drawn from four reels with such wires preferably being drawn through a suitable bath to wet the surfaces thereof. In this regard galvanized wire may, for example, be drawn through a zinc chloride flux of a specific gravity of 1.06. Thereafter, the four wires 8 may pass through an asbestos wipe to remove excess flux and for maintaining the four wires parallel and in a horizontal plane. The wires 8 are then passed through a pot of molten zinc held, for example, at 850° F. to provide a body or mass 9 in which the wires are embedded or encapsulated. The wires 8 in passing from the zinc pot may be wiped free of excess zinc in an asbestos wipe conventionally used for galvanizing wire. The last referred to asbestos wipe may be arranged in a fixture to impose pressure on the several wires 8. On leaving the asbestos wipe, the wires are maintained in a horizontal plane until the zinc solidifies thus making a strip of the four wires 8 rigidly embedded in the zinc body or mass 9. Strip material thus formed may then be wound on a take-up reel by conventional means. After formation of the strip as above described, the strip material may then be wound into circumferentially successive superposed convolutions providing, for example, the layers 6 and 7 to form a tire bead. It will, of course, be understood that any number of wires 8 may be employed, as desired, for the layers of a tire bead. Also, materials other than zinc may be used for the body or mass portion of the strip. In this regard the encapsulating material should be characterized by being rigid when solidified and having a melting point less than 1000° F. so as not to unduly effect the tensile strength of the wires 8. Wire of any suitable desired compositions having high tensile strength may be employed for the wires 8 of the layers of the bead. It is, of course, desirable in embedding the several wires in the mass 9 that the wires be retained in side-by-side parallel relationship.

Before laying strip material aforedescribed in a plurality of circumferentially successive superposed layers, the strip material may then be coated with brass or other rubber adhesive material, such as indicated at 11, to provide for good adhesion to rubber in assembling of the bead in a tire. Also, if desired, the strip material may be wound and then coated with adhesive material.

Referring to FIGURE 2 there is shown another embodiment of the invention in which circumferentially successive superposed layers 12 and 13 are formed in th cessive superposed layers 12 and 13 are formed in th same manner as layers 6 and 7, but in which the oppose adjoining surface portions of the layers 12 and 13 ar secured to each other as by solder 14 or other suitabl material to hold the several layers in fixed relation ci cumferentially with respect to each other.

In the foregoing tire beads, an assembly is provide in which the several convolutions of wire in each lay are held in fixed lateral predetermined relation with r spect to each other. Also, the successive superimpos layers of the beads, especially, for example, as describ in connection with FIGURE 2 are also retained in pi determined relative fixed circumferential relation with spect to each other. The aforedescribed constructions pi vide for assembly of tire beads in a tire so that upon sh ing of a tire carcass with which the beads are associat into the desired tire shape, the round wires of the be and the layers are retained in predetermined fixed pc tions to provide strong beads for a tire.

In the foregoing constructions, the round wires h in fixed relation with respect to each other provide ma mum strength for a given cross sectional area of a t bead.

The invention claimed is:
1. A tire bead comprising a plurality of circumferentially successive superposed layers, and in which each of said layers comprises a plurality of wires disposed in a plurality of successive side-by-side convolutions embedded in a mass of rigid material for holding said wires in rigid fixed relation with respect to each other.
2. The tire bead of claim 1 in which said mass is of metallic material having a melting temperature less than 1000° F.
3. The tire bead of claim 1 characterized by opposed surfaces of said successive layers being joined with each other.
4. The tire bead of claim 1 characterized by said layers being coated with a rubber adhesive coating.

References Cited

UNITED STATES PATENTS

| | | |
|---|---|---|
| 1,774,748 | 9/1930 | Gore. |
| 3,106,952 | 10/1963 | Rudder _____ 152—362 |

ARTHUR L. LA POINT, *Primary Examiner.*